United States Patent [19]
Kojima et al.

[11] Patent Number: 5,775,294
[45] Date of Patent: Jul. 7, 1998

[54] PRIME MOVER CONTROL RESPONSIVE TO ACCELERATOR OPERATION

[75] Inventors: Hiroyuki Kojima, Nishio; Mutsumi Kawamoto, Nagoya, both of Japan

[73] Assignee: Aisin AW Co., Ltd., Japan

[21] Appl. No.: 777,180

[22] Filed: Dec. 29, 1996

[30] Foreign Application Priority Data

Dec. 28, 1995 [JP] Japan .................. 7-343281

[51] Int. Cl.$^6$ ...................... F02D 7/00
[52] U.S. Cl. ...................... 123/399
[58] Field of Search ............... 123/399, 361; 364/426.04

[56] References Cited

U.S. PATENT DOCUMENTS

5,611,309  3/1997  Kumagai et al. ............ 123/399
5,625,558  4/1997  Togai et al. ............... 364/426.041
5,645,033  7/1997  Person et al. ............... 123/399
5,664,542  9/1997  Kanazawa et al. ........... 123/361

*Primary Examiner*—Raymond A. Nelli
*Attorney, Agent, or Firm*—Lorusso & Loud

[57] ABSTRACT

A control system for control of a vehicle prime mover includes an operation mode selecting device for selecting an operation mode, an accelerator operator, an operation mode detector for detecting the selected operation mode, an accelerator sensor for detecting an accelerator operating amount, an accelerator instruction value calculator for setting an accelerator instruction value to 0 unconditionally when the non-travel mode is selected and determining the accelerator instruction value based on a difference between the accelerator operating amount and a zero point value when the travel mode is selected, and an instruction value output calculator for determining and outputting an instruction value to the prime mover. The accelerator instruction value calculator sets the zero point value corresponding to the accelerator operating amount when the operation mode is changed.

4 Claims, 9 Drawing Sheets

PRIME MOVER CONTROL RESPONSIVE TO ACCELERATOR OPERATION

BACKGROUND OF THE INVENTION

1. Field of the Invention

The present invention relates to a vehicle prime mover control system responsive to accelerator operation.

2. Description of the Related Art

In a conventional vehicle powered by a prime mover such as an engine or a motor the degree of accelerator depression is detected by an accelerator sensor and output of the prime mover is controlled by a control device in accordance with the degree of accelerator depression.

The control device converts the signal from the accelerator sensor, i.e. analog/digital (A/D) conversion, to obtain an accelerator operating amount, compares that accelerator operating amount with a zero point value corresponding to a 0 setting and adopts the difference therebetween as an accelerator instruction value, and refers to a map based on the accelerator instruction value or calculates an output value for the prime mover.

However, if a driver operates a shift lever with his or her foot unconsciously placed on the accelerator pedal of the conventional vehicle and changes the operation mode from neutral (N) to forward travel (D), the aforementioned accelerator operating amount is increased by some amount. On the other hand, because the zero point value is a fixed value, the difference between the accelerator operating amount and the zero point value increases. Thus, the accelerator instruction value increases correspondingly so that the output of the prime mover is also increased. As a result, the vehicle accelerates at a rate faster than that expected by the driver.

Figure 2:
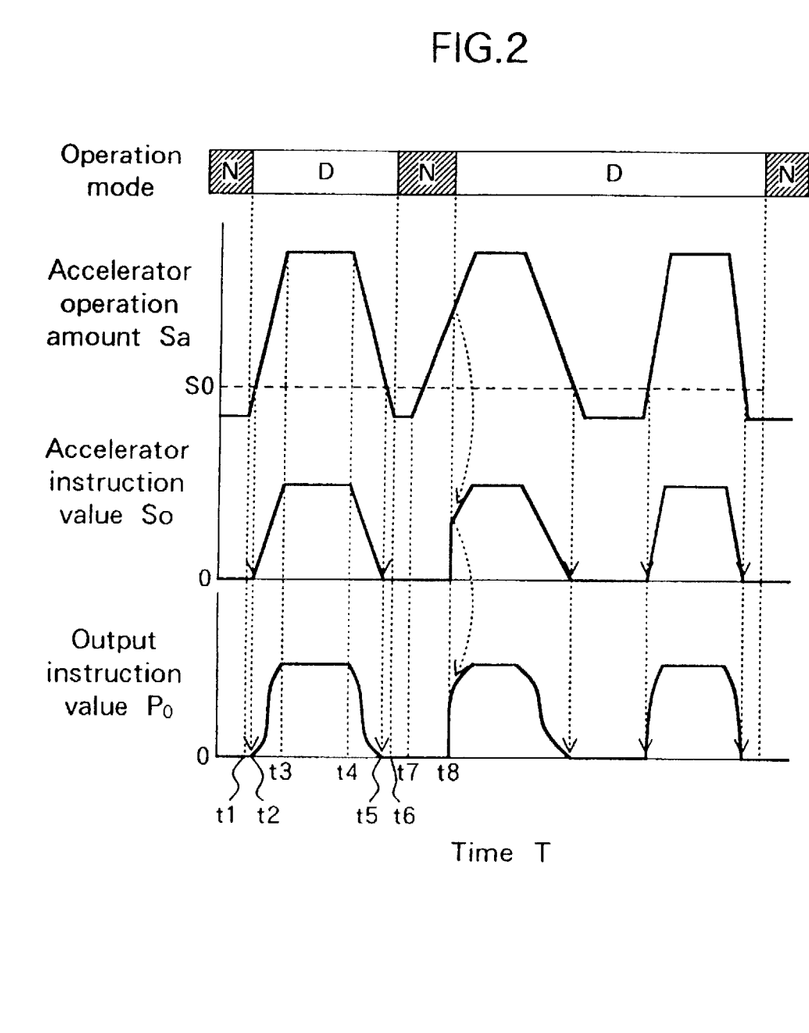
FIG. 2 is a time chart for a conventional control system in operation of a vehicle.

FIG. 2 is a time chart for a conventional vehicle wherein the abscissa represents time T and the ordinate represents the accelerator operating amount Sa, accelerator instruction value So, and output instruction value $P_o$. N indicates that the operation mode is neutral and D indicates that the operation mode is forward (drive). As shown in this figure, when the driver operates the shift lever (not shown) to change the operation mode from neutral to forward at time t1 and starts depressing the accelerator pedal, the accelerator operating amount Sa increases in proportion to the increase in degree of accelerator depression. As also seen in FIG. 2, when the accelerator operating amount Sa is smaller than the zero point value So, the accelerator instruction value So is 0 and consequently the output instruction value $P_o$ is also 0.

Then, after the accelerator operating amount Sa has become equal to the zero point value So at time t2, the accelerator instruction value So increases in proportion to the increase in the accelerator operating amount Sa and the output instruction value $P_o$ also increases correspondingly. The output instruction value $P_o$ is determined by applying the accelerator instruction value So to a predetermined equation or a map. In this case, the gradient of the output instruction value $P_o$ is set to a small value in order to avoid the occurrence of shock which might otherwise be caused by an abrupt rise in the output instruction value $P_o$.

Subsequently, when the accelerator operating amount Sa becomes constant at time t3, the accelerator instruction value So and the output instruction value $P_o$ also become constant. As before, the output instruction value $P_o$ is determined by applying the accelerator instruction value So to a predetermined equation or a map. In this case, the gradient of the output instruction value P0is set to a small value in order to avoid the occurrence of shock which might otherwise be caused if the output instruction value $P_o$ abruptly became constant.

When the driver then begins to release the accelerator pedal at time t4, the accelerator operating amount Sa decreases in proportion to the decrease in the degree of accelerator depression. The accelerator instruction value So and the output instruction value $P_o$ also decrease correspondingly. Again, the output instruction value $P_o$ is determined by applying the accelerator instruction value So to a predetermined equation or a map. In this case, the gradient of the output instruction value $P_o$ is set to a small value in order to avoid the occurrence of shock which otherwise might be caused by an abrupt decrease in the output instruction value $P_o$.

Then, after the accelerator operating amount Sa has become equal to the zero point value So at time t5, the accelerator instruction value So is 0 and the output instruction value $P_o$ is also 0, as long as the accelerator operating amount Sa is smaller than the zero point value So. Again, the output instruction value $P_o$ is determined by applying the accelerator instruction value So to a predetermined equation or to a map. In this case, the gradient of the output instruction value $P_o$ is set to a small value in order to avoid the occurrence of shock which might be caused if the output instruction value $P_o$ were to abruptly go to 0.

When the driver operates the shift lever to change the operation mode from forward travel to neutral at time t6 and releases the accelerator pedal completely to bring the accelerator operating amount down to 0, the accelerator instruction value So and the output instruction value $P_o$ are maintained at 0.

Then, when the driver begins to depress the accelerator pedal at time t7, the accelerator operating amount Sa increases in proportion to the increase in the degree of accelerator pedal depression. However, even if the accelerator operating amount Sa becomes larger than the zero point value So, the accelerator instruction value So and the output instruction value $P_o$ are maintained at 0 unconditionally, as long as the selected operation mode is neutral. Subsequently, when the driver operates the shift lever to change the operation mode from neutral to forward travel at time t8, the difference between the accelerator operating amount Sa and the zero point value So at time t8 corresponds to the accelerator instruction value So, because the accelerator pedal has already been depressed. Thus, the output instruction value $P_o$ also increases in proportion to the increase in the accelerator instruction value So.

If the selected operation mode is forward travel when the accelerator operating amount Sa is larger than the zero point value So, the accelerator instruction value So and the output instruction value $P_o$ increase in proportion to the accelerator operating amount Sa.

As described above, while the selected operation mode is neutral, even if the accelerator pedal is depressed by the driver, the accelerator instruction value So and the output instruction value $P_o$ are unconditionally maintained at 0. After that, when the selected operation mode is forward travel, the accelerator instruction value So and the output instruction value $P_o$ will respectively correspond to the accelerator operating amount Sa.

Thus, if the driver operates the shift lever to change the operation mode from neutral to forward travel with his or her foot unconsciously placed on the accelerator pedal, the aforementioned accelerator operating amount Sa is increased due to the presence of the foot on the accelerator pedal. Because the zero point value So is a fixed value, the difference between the accelerator operating amount Sa and the zero point value So also increases. Thus, the accelerator instruction value So and the output instruction value $P_o$ increase correspondingly. As a result, the vehicle accelerates at a rate different from that expected by the driver.

SUMMARY OF THE INVENTION

Accordingly, an object of the present invention is to solve the above-described problem in the control apparatus of the conventional vehicle and to provide an improved control apparatus giving enhanced travel comfort.

To achieve the above-described object, the present invention provides a power plant control system for a vehicle including an operation mode selecting device for selecting a travel mode or a non-travel mode as an operation mode, an accelerator operator, operation mode detecting means for detecting the operation mode selected by the operation mode selecting device, an accelerator sensor for detecting an accelerator operating amount, accelerator instruction value determining means for unconditionally setting the accelerator instruction value at 0 when the non-travel mode is selected and for determining the accelerator instruction value based on the difference between the accelerator operating amount detected by the accelerator sensor and a zero point value when the travel mode is selected, and output instruction value determining means for determining an output instruction value for the prime mover based on the selected operation mode and the determined accelerator instruction value.

The aforementioned accelerator instruction value determining means includes zero point value setting means for setting the zero point value in accordance with the accelerator operating amount when the operation mode is changed from the non-travel mode to the travel mode.

The zero point value setting means preferably sets the zero point value to the sum of the accelerator operating amount and the amount of accelerator play when the selected operation mode is the non-travel mode, and when the operation mode is changed from the non-travel mode to the travel mode, maintains the zero point value at that value.

In another preferred embodiment the zero point value setting means sets the zero point value in accordance with the accelerator operating amount when the selected operation mode is the travel mode and the sum of the accelerator operating amount and the accelerator play becomes smaller than the zero point value.

In still another preferred embodiment of the present invention, wherein the prime mover is a motor, the output instruction value is an electric current feed for the motor and is based on the selected operation mode and on the determined accelerator instruction value.

DESCRIPTION OF THE PREFERRED EMBODIMENTS

Preferred embodiments of the present invention will now be described in detail with reference to the accompanying drawings.

Figure 1:
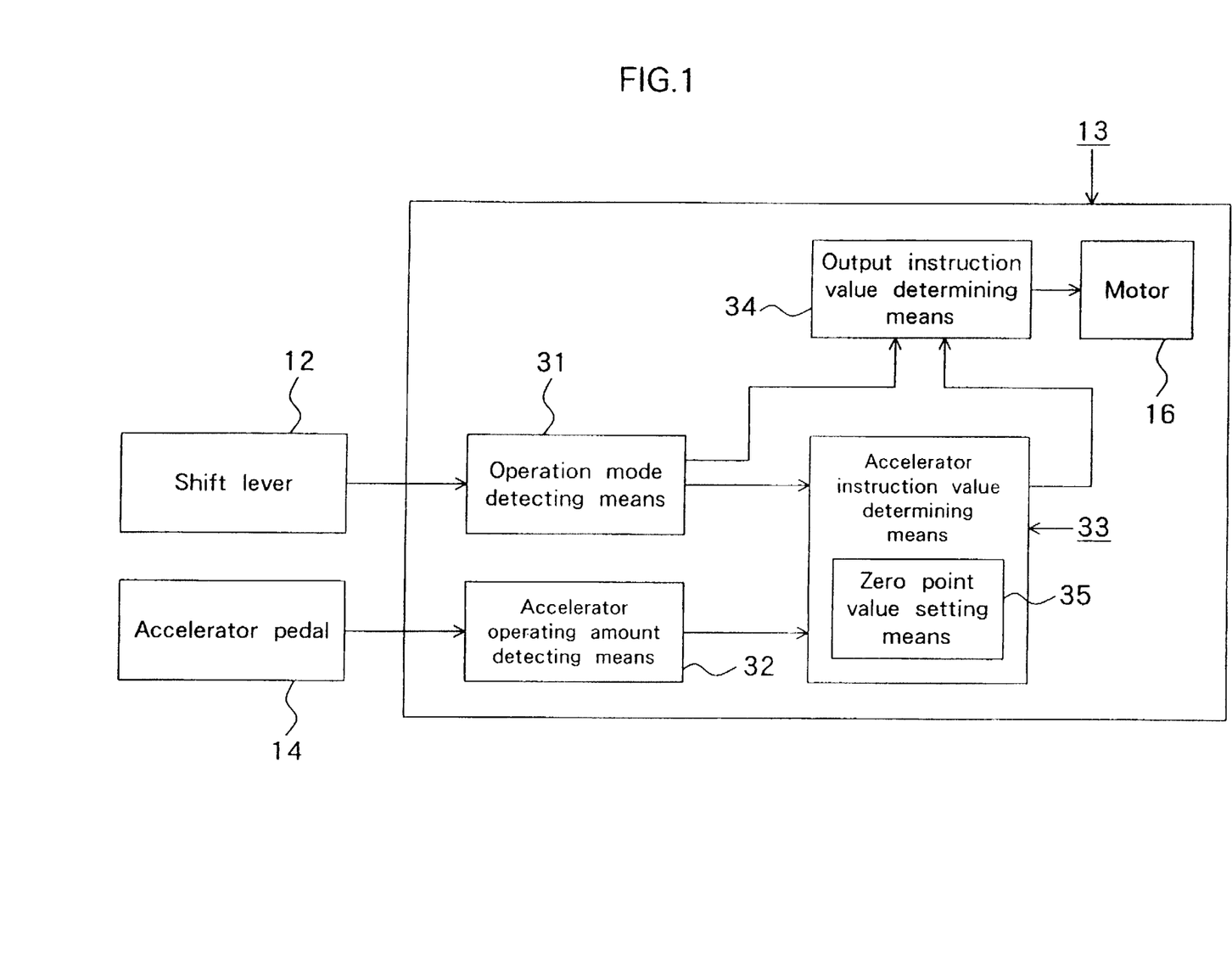
FIG. 1 is a block diagram of a control system for a vehicle according to an embodiment of the present invention.

As shown in FIG. 1, a shift lever 12, which serves as an operation mode selecting device, allows selection of a travel mode or a non-travel mode.

A CPU 13 includes operation mode detecting means 31 for detecting the operation mode selected by movement of the shift lever 12, accelerator operating amount detecting means 32 for detecting the amount of accelerator operation by the accelerator pedal 14 ("accelerator operating device"), accelerator instruction value determining means 33 for setting the accelerator instruction value to 0 when the non-travel mode is selected and determining the accelerator instruction value based on a difference between an accelerator operating amount detected by the accelerator operating amount detecting means 32 and zero point value when the travel mode is selected, and output instruction value determining means 34 for determining an output instruction value for a motor 16, based on the operation mode selected by the shift lever 12 and the accelerator instruction value determined by the accelerator instruction value determining means 33.

The accelerator instruction value determining means 33 includes zero point value setting means 35 for setting the aforementioned zero point value in accordance with the accelerator operating amount when the operation mode is changed from a non-travel mode to a travel mode.

Figure 3:
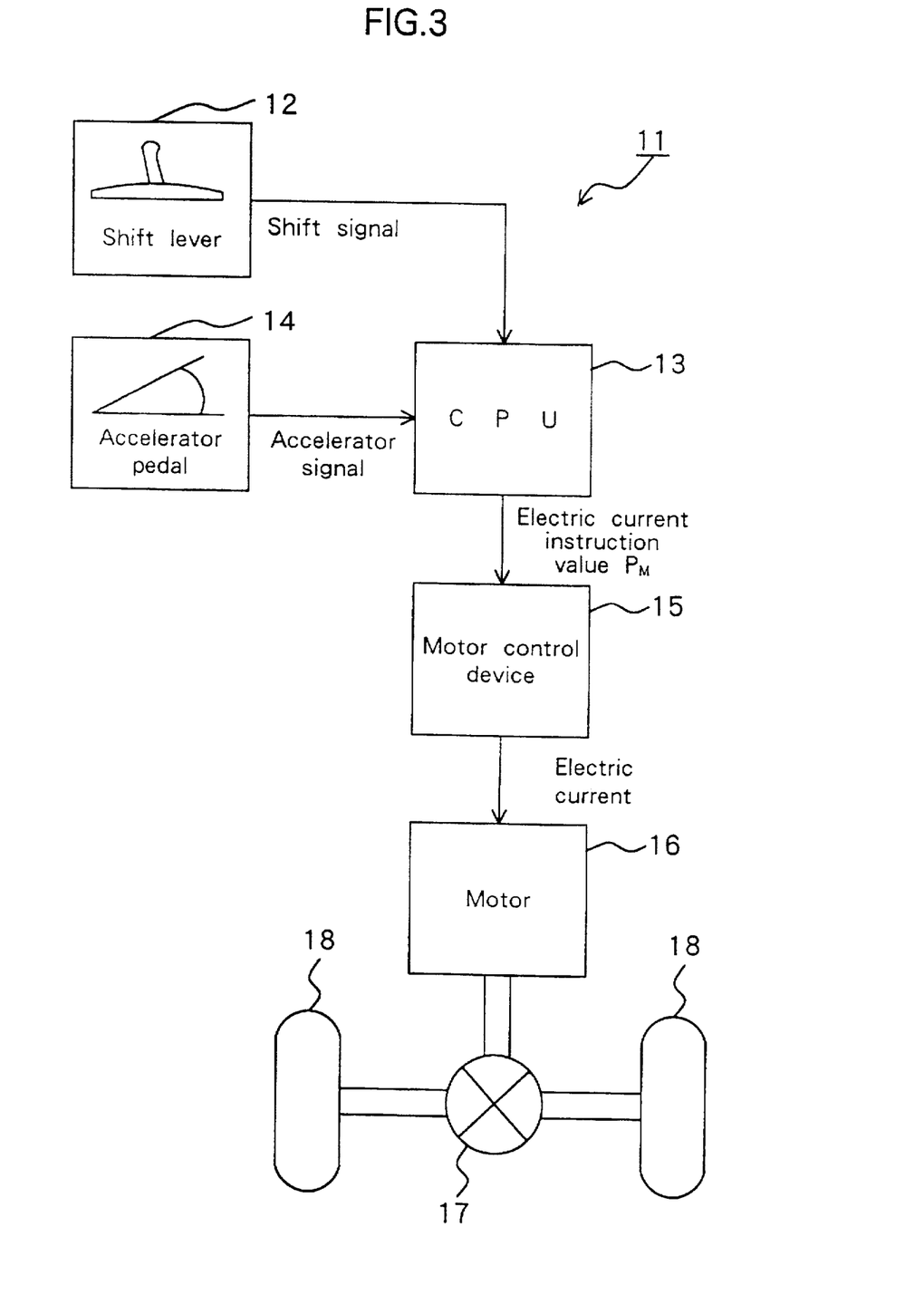
FIG. 3 is a schematic diagram of a control system for a vehicle according to the embodiment of FIG. 1.

As shown in FIG. 3, an electric vehicle 11 is provided with the shift lever 12 for selecting the operation mode. According to this embodiment, the shift lever 12 is operated to select among operation modes including parking (P) and neutral (N), as non-travel modes, and reverse (R) and forward (D), as travel modes. A shift signal corresponding to the selected operation mode is generated by the shift lever 12 and output to the CPU 13.

When the accelerator pedal 14 is depressed, an accelerator signal corresponding to the accelerator operating amount Sa is generated by a sensor associated with the accelerator pedal 14 and output to the CPU 13.

The CPU 13 controls operation of the entire control system apparatus of the electric vehicle 11 according to a control program.

Thus, CPU 13 generates an electric instruction value $P_M$ as an output instruction value $P_o$, based on the selected operation mode and the accelerator operating amount Sa, responsive to receipt of shift and accelerator signals, and outputs the generated electric instruction value $P_M$ to a motor control device. Upon receiving the electric instruction value $P_M$, the motor control device 15 supplies an electric current corresponding to the electric instruction value $P_M$ to the motor 16 which serves as a prime mover in this embodiment.

Torque generated by the motor 16 is transmitted to a differential unit 17, differentiated by the differential unit 17, and transmitted to the vehicle drive wheels 18.

Although the motor 16 is used as the prime mover in this embodiment, the motor 16 may be replaced by an engine. In this case, the CPU 13 generates an instruction value for degree of throttle opening as the output instruction value $P_o$ and outputs the instruction value for degree of throttle opening to an engine control device. Alternatively, the prime mover may be a combination of an engine and the motor 16.

In the case where an engine is employed as the prime mover, if a driver leaves his or her foot on the accelerator pedal unconsciously while in neutral, the driver can easily recognize that his or her foot is on the accelerator pedal from fluctuations in acoustic intensity, vibration, or the like induced by the increase in engine speed. On the other hand, in the case where the motor 16 is employed as the prime mover of a vehicle, no output of the motor 16 is generated when the operation mode is neutral. Thus, the driver sometimes does not recognize that his or her foot is on the accelerator pedal. Consequently, when the operation mode is switched to forward travel or reverse, the vehicle accelerates at a rate different from that expected.

Figure 4:
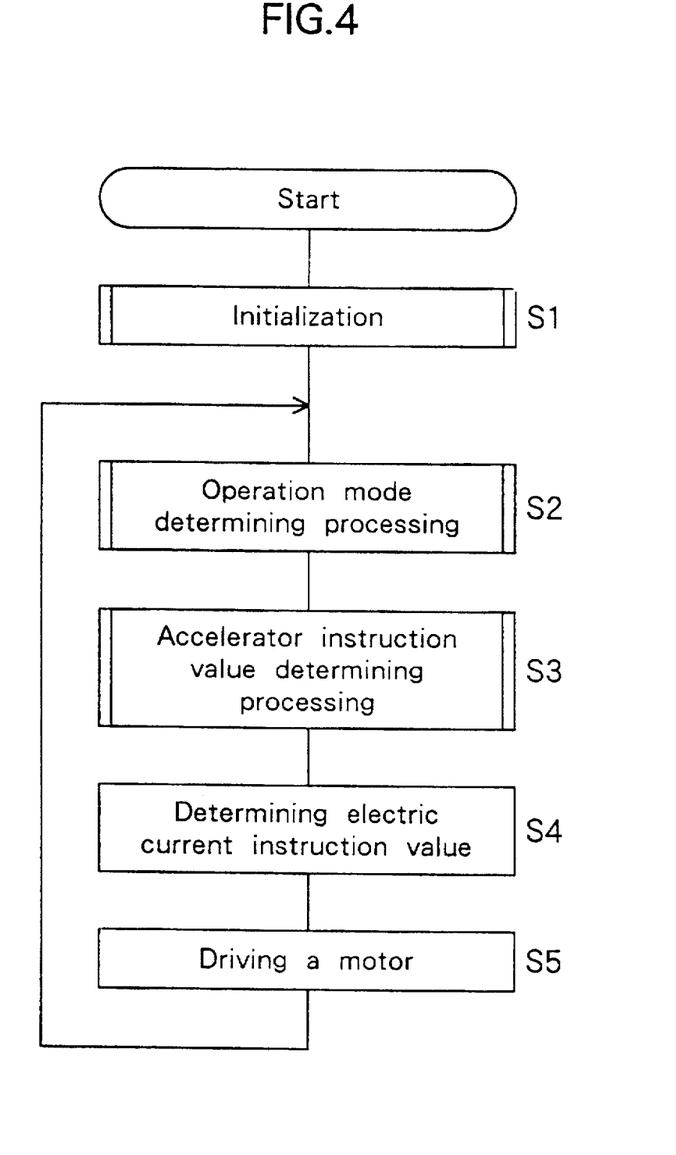
FIG. 4 is a flow chart of a main routine for operation of the control system for a vehicle according to the embodiment of FIG. 1.

In the main routine of FIG. 4 first the CPU 13 (FIG. 3) determines which operation mode is selected in response to the shift signal from the shift lever 12 after the system has been initialized. Subsequently, the CPU 13 detects the accelerator operating amount Sa and then determines the accelerator instruction value So based on the accelerator operating amount Sa.

Then the CPU 13 determines the electric current instruction value $P_M$, which is output to the motor control device 15. The motor control device 15 supplies a current corresponding to the electric current instruction value PM to the motor 16 so as to drive the motor 16.

More specifically, in the main routine of FIG. 4:

In step S1, the system is initialized.

In step S2, the selected operation mode is determined, i.e., the operation mode selected by operation of the shift lever 12 is detected, and whether or not the operation mode has been changed is determined.

In step S3, the accelerator instruction value determining means 33 (FIG. 1) determines the accelerator instruction value So based on the accelerator operating amount Sa.

In step S4, the output instruction value determining means 34 determines the electric current instruction value $P_M$ based on the selected operation mode and the accelerator instruction value So.

In step S5, the motor control device 15 supplies a current corresponding to the electric current instruction value $P_M$ to the motor 16 so as to drive the motor 16.

In the foregoing embodiment, even if the operation mode is changed from a non-travel mode to a travel mode, for example, from parking to reverse, neutral to reverse, neutral to drive or the like, while the accelerator pedal 14 is depressed, it is possible to prevent the electric vehicle 11 from being driven at a speed different from that output expected by the driver.

Thus, if the shift lever 12 is operated and the selected operation mode is a non-travel mode, the accelerator instruction value S is set to 0 regardless of the accelerator operating amount Sa.

If the operation mode is changed from a non-travel mode to a travel mode, the sum of the accelerator operating amount Sa at the time when the operation mode is changed to the travel mode and a value for accelerator play Sc is determined and that sum is set as zero point value S0.

Thus, immediately after the operation mode has been changed from the non-travel mode to the travel mode, the accelerator instruction value So is set to 0 regardless of the position of the accelerator pedal 14. After that, only when the accelerator pedal 14 is further depressed, will the accelerator instruction value So take a value different from 0.

Even if the operation mode is changed from a travel mode to a non-travel mode with the accelerator pedal 14 depressed, when the sum of the accelerator operating amount Sa and the accelerator play Sc becomes less than the zero point value So by release of the accelerator pedal 14, the sum of the accelerator operating amount Sa and the play Sc is set as a new zero point value S0.

Next, a subroutine for the process of determining the operation mode in STEP 2 in FIG. 4 will be described.

Figure 5:
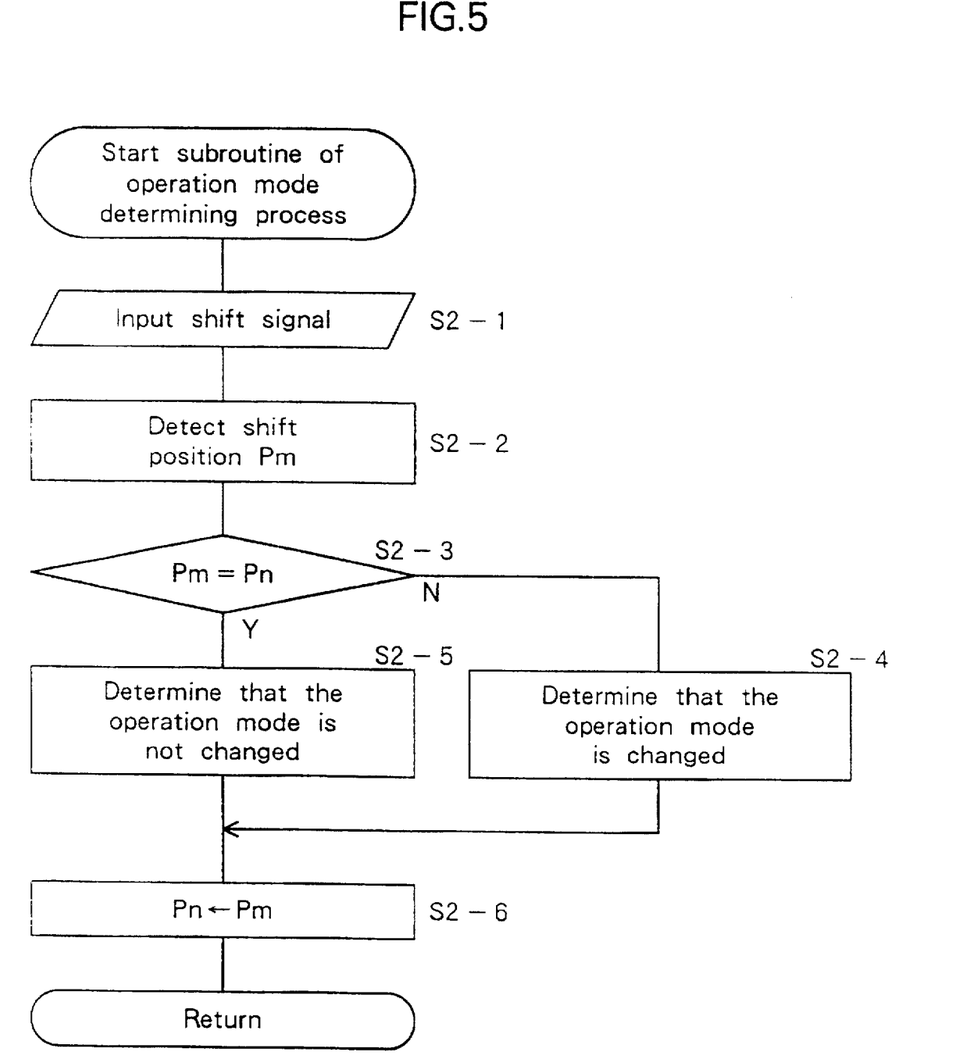
FIG. 5 is a flow chart of an operation mode determining subroutine for step S2 in the main routine of FIG. 4.

FIG. 5 is a flow chart for the subroutine for the step of determining the operation mode (step 2 in FIG. 4). When a shift signal is input from the shift lever 12, the operation mode detecting means 31 detects a shift position Pm in response to the shift signal and detects the operation mode based on the shift position $P_m$. Subsequently, by comparing a current shift position $P_m$ with the shift position Pn last detected, whether or not the operation mode has been changed is determined. Thus, the shift position Pn last detected is stored in a buffer (not shown) within the CPU 13.

More specifically, as shown in FIG. 5:

In step S2–1, a shift signal generated by the shift lever 12 is input to the CPU 13.

In step S2—2, the operation mode detecting means 31 of the CPU 13 detects the selected operation mode according to the current shift position $P_m$.

In step S2–3, whether or not the current shift position $P_m$ is the same as the shift position Pn last detected is determined. If the current shift position Pm is the same as the shift position Pn last detected, the program proceeds to step S2–5. Otherwise, the program proceeds to step S2–4.

In step S2–4, it is determined that the operation mode has been changed.

In step S2–5, it is determined that the operation mode has not been changed.

In step S2–6, it is assumed that the current shift position $P_m$ is the shift position detected last time.

Figure 6:
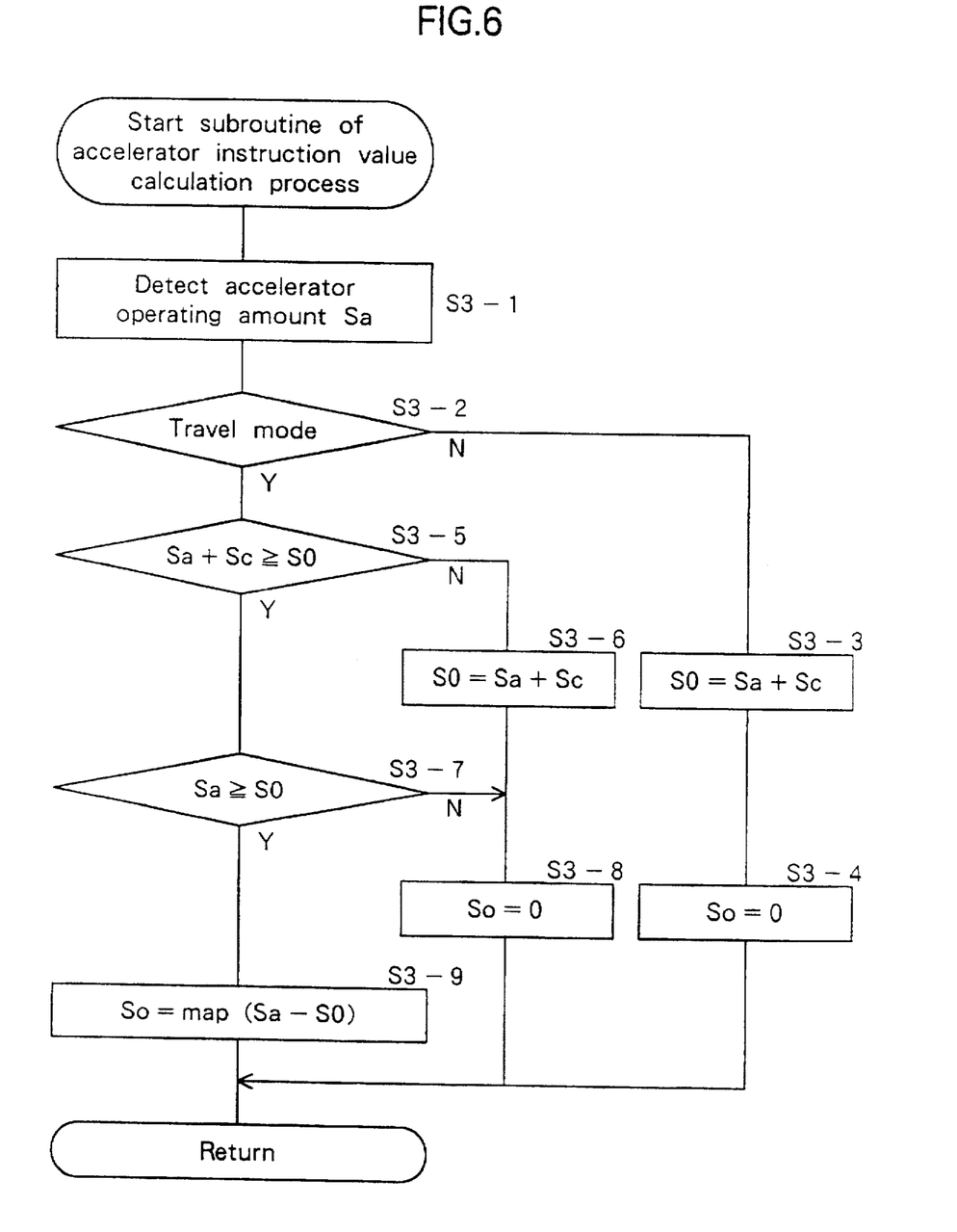
FIG. 6 is a flow chart of the accelerator instruction value determining subroutine for step S3 in the main routine of FIG. 4.

FIG. 6 shows a flow chart for the subroutine for determination of the accelerator instruction value in step S3 in FIG. 4. First, upon receiving an accelerator signal generated by the accelerator pedal 14, the CPU 13 (FIG. 3) converts that signal, i.e. analog/digital (A/D) conversion, to a value for accelerator operating (depression) amount Sa.

Then, whether the operation mode determined by the CPU 13 is a non-travel mode, such as parking or neutral, or a travel mode, such as reverse or forward, is determined. If the operation mode is a non-travel mode, it is assumed that the sum of the accelerator operating amount Sa and the play Sc is the zero point value S0. Also, the accelerator instruction value So in the non-travel mode is set to 0.

When the operation mode is a travel mode, if the accelerator operating amount Sa is smaller than the zero point value S0, determined by comparing the accelerator operating amount Sa with the zero point value S0, the accelerator instruction value is set to 0. Furthermore, if the sum of the accelerator operating amount Sa and the accelerator play Sc is smaller than the zero point value S0, it is determined that the zero point has shifted. Then, the zero point value So is changed to the sum of the accelerator operating amount Sa and the accelerator play Sc.

Figure 7:
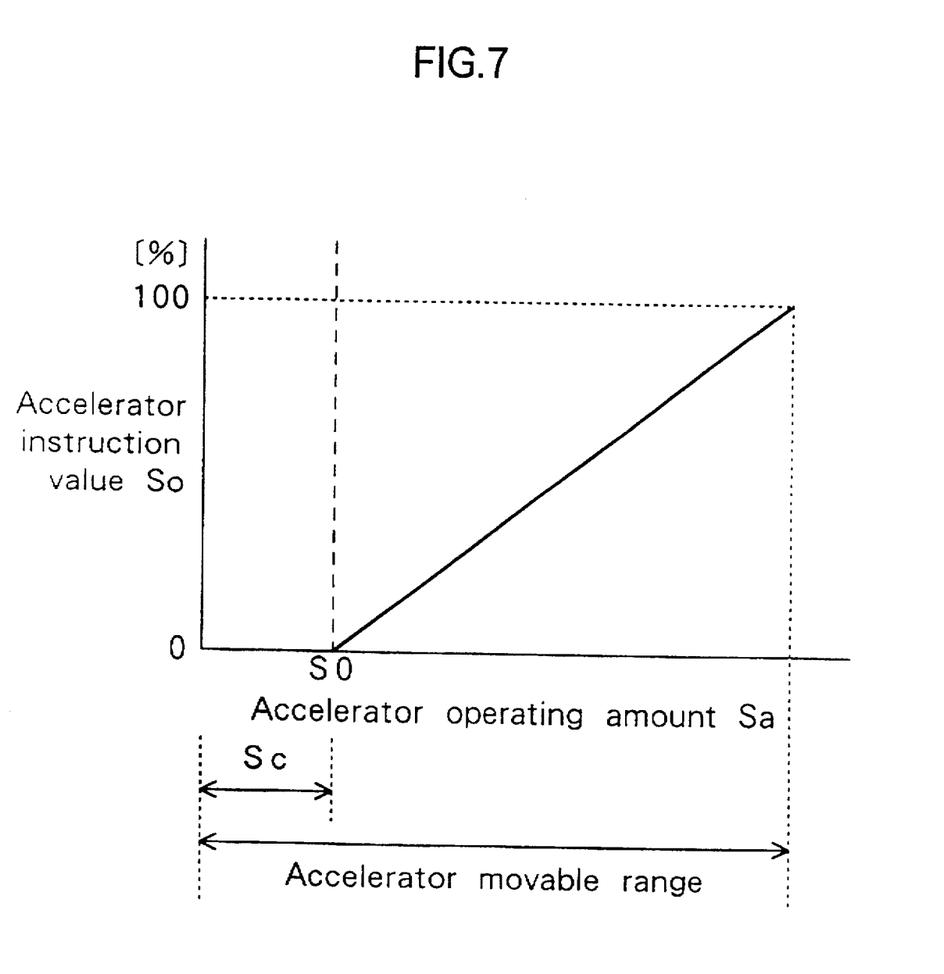
FIG. 7 is a graph which serves as an accelerator instruction value map which may be utilized in step S3–9.

Only when the accelerator operating amount Sa is larger than the zero point value S0 and within an accelerator operating range, as determined by reference to the accelerator instruction map as shown in FIG. 7 or by calculation using a predetermined equation, is the accelerator instruction value So determined.

Figure 8:
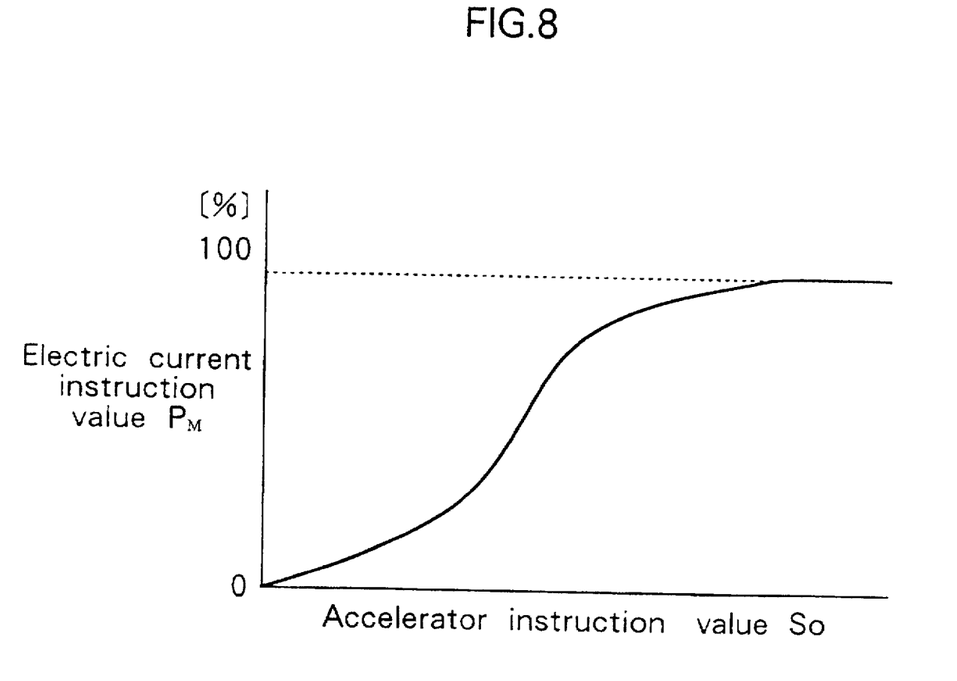
FIG. 8 is a graph which serves as an output instruction value map which may be utilized in step S4 of the main routine of FIG. 4.

Next, the CPU 13 determines the current instruction value $P_M$ based on the aforementioned accelerator instruction value So, referring to the torque instruction value map as shown in FIG. 8. In this case, the gradient of the electric current instruction value $P_M$ is set to a small value over the ranges in which the accelerator instruction value So is small or large, in order to avoid the occurrence of shock which might be caused if the electric current instruction value $P_M$ abruptly rises or becomes constant.

The determined electric current instruction value $P_M$ is compared with a restrictive value such as the temperature of the motor 16 and those of other conditions by an output determining section (not shown) of the CPU 13. After that, the instruction value $P_M$ is output to the motor control device 15.

More specifically, in the subroutine of FIG. 6:

In step S3–1, the accelerator operation amount detecting means 32 (FIG. 1) detects the accelerator operating amount Sa.

In step S3–2, whether or not the operation mode is a travel mode is determined. If a travel mode is selected, the program proceeds to step S3–5. If a travel mode is not selected, in other words if a non-travel mode is selected, the program proceeds to step S3–5.

In step S3–3, the zero point value setting means 35 of the accelerator instruction value determining means 33 defines the sum of the accelerator operating amount Sa and the play Sc as the zero point value S0.

In step S3–4, the accelerator instruction value So is set to 0 and the program is returned to the initial step.

In step S3–5, whether or not the sum of the accelerator operating amount Sa and the accelerator play Sc is larger than the zero point value So is determined. If the sum of the accelerator operating amount Sa and the play Sc is larger than the zero point value S0, the program proceeds to step s3–7. If the sum of the accelerator operating amount Sa and the play Sc is smaller than the zero point value S0, the program proceeds to step S3–6.

In step S3–6, the zero point value setting means 35 of the accelerator instruction value determining means 33 defines the sum of the accelerator operating amount Sa and the play Sc as the zero point value S0.

In step S3–7, whether or not the accelerator operating amount Sa is larger than the zero point value S0 is determined. If the accelerator operating amount Sa is larger than the zero point value S0, the program proceeds to step S3–9. If the accelerator operating amount Sa is smaller than the zero point value S0, the program proceeds to step S3–8.

In step S3–8, the accelerator instruction value So is set to 0 and the program is returned to the initial step.

In step S3–9, the accelerator instruction value So is determined based on the accelerator operating amount Sa and the zero point value S0 with reference to the accelerator instruction value map, and then the program is returned to the initial step.

Figure 9:
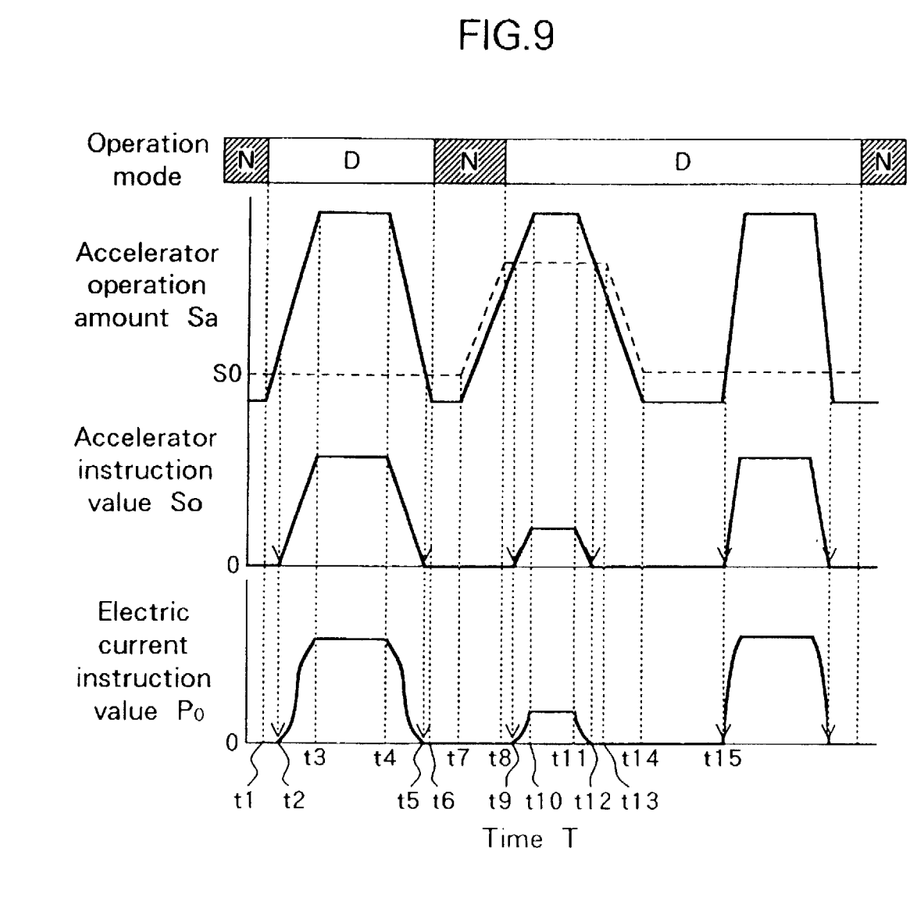
FIG. 9 is a time chart for operation of the control routine of FIG. 4.

Next, a time chart for control of a vehicle in accordance with the foregoing embodiment will be described with reference to FIG. 9. In FIG. 9 the abscissa represents time T and the ordinate represents the accelerator operating amount Sa, the accelerator instruction value So and the electric current instruction value $P_M$. N indicates that the operation mode is neutral and D indicates the forward travel.

If the driver operates the shift lever 12 (FIG. 3) at the time t1 to change the operation mode from neutral to forward and starts depressing the accelerator pedal 14, as shown in this figure, the accelerator operating amount Sa increases in proportion to the increase in the degree of accelerator depression. However, because the operation mode is changed from a non-travel mode to a travel mode, the sum of the accelerator operating amount Sa at the time when the operation mode is changed to the travel mode and the accelerator play Sc is defined as the zero point value S0.

While the accelerator operating amount Sa is smaller than the zero point value S0, the accelerator instruction value So is 0. As a result, the electric current instruction value $P_M$ is also 0.

In the sum of the accelerator operating amount Sa and the play Sc becomes larger than the sum of the zero point value S0 and the play Sc at time t2, the accelerator instruction value So increases in proportion to the increase in the accelerator operating amount Sa, and the electric current instruction value $P_M$ also increases. The electric current instruction value $P_M$ is determined by applying the accelerator instruction value So to a predetermined equation or to a map. In this case, the gradient of the electric current instruction value $P_M$ is set to a small value in order to avoid the occurrence of shock which would be caused by an abrupt rise in the electric current instruction value $P_M$.

Next, if the accelerator operating amount Sa becomes constant at time t3, the accelerator instruction value So and the electric current instruction value $P_M$ also become constant. The electric current instruction value $P_M$ is determined by the accelerator instruction value So and the predetermined equation or the map. In this case, the gradient of the electric current instruction value $P_M$ is set to a small value in order to avoid the occurrence of shock, which might otherwise occur if the electric current instruction value $P_M$ abruptly became constant.

Subsequently, if the driver starts releasing the accelerator pedal 14 at time t4, the accelerator operating amount Sa decreases in proportion to the decrease in the amount of accelerator pedal depression. The accelerator instruction value So also decreases correspondingly and the electric current instruction value $P_M$ also decreases. The electric current instruction value $P_M$ is determined by applying the accelerator instruction value So to a predetermined equation or to the map. The gradient of the electric current instruction value $P_M$ is set to a small value in order to avoid the occurrence of shock which would be caused by an abrupt decrease in the electric current instruction value $P_M$.

If the sum of the accelerator operating amount Sa and the play Sc becomes smaller than the sum of the zero point value S0 and the play Sc at time t5, the accelerator instruction value So and the current instruction value $P_M$ become 0. The electric current instruction value $P_M$ is determined by the accelerator instruction value So applied in the predetermined equation or to the map. In this case also, the gradient of the electric current instruction value $P_M$ is set to a small value in order to avoid the occurrence of shock, which might be caused if the electric current instruction value $P_M$ were to abruptly become 0.

Next, when the driver operates the shift lever 12 to change the operation mode from forward travel to neutral and releases the accelerator pedal completely, the operation mode is changed from the travel mode to the non-travel mode. Thus, the sum of the accelerator operating amount Sa and the play Sc is defined as the zero point value S0. In addition, because the operation mode is a non-travel mode, the accelerator instruction value So and the electric current instruction value $P_M$ are set to 0 unconditionally.

Then, when the driver starts depressing the accelerator pedal 14 again at time t7, the accelerator operating amount Sa increases in proportion to the increase in the degree of accelerator pedal depression. Consequently, the zero point value S0 increases also in proportion to the accelerator operating amount Sa. Because the operation mode is a non-travel mode, in the meantime the accelerator instruction value So and the electric current instruction value $P_M$ are set to 0 unconditionally.

Subsequently, when the driver operates the shift lever 12 to change the operation mode from neutral to forward at time t8, the operation mode is changed from the non-travel mode to the travel mode. Thus, the sum of the accelerator operating amount Sa at the time when the operation mode is changed to the non-travel mode and the play Sc is defined as the zero point value S0. Then, while the sum of the accelerator operating amount Sa and the play Sc remains smaller than the sum of the zero point value S0 and the play Sc, the accelerator instruction value So and the electric current instruction value $P_M$ are set to 0.

In this case, the accelerator pedal 14 has been already depressed while the operation mode is the non-travel mode. However, even after the operation mode has been changed from the non-travel mode to the travel mode, the accelerator instruction value So and the electric current instruction value $P_M$ are set to 0 until the pedal is depressed further by the amount of the play Sc.

Thus, the motor 16 can be prevented from being driven while in transition of the operation mode from a non-travel mode to a travel mode. Therefore, it is possible to drive the vehicle at a speed output expected by the driver.

Next, when the accelerator operating amount Sa exceeds the zero point value S0 at time t9, a difference between the accelerator operating amount Sa and the zero point value S0 is defined as the accelerator instruction value So. Thus, after that, the accelerator instruction value So and the electric current instruction value $P_M$ increase in proportion to the increase in the accelerator operating amount. As before, the electric current instruction value $P_M$ is determined by applying the accelerator instruction value So in the predetermined equation or to the map. In this case also, the gradient of the electric current instruction value $P_M$ is set to a small value in order to avoid the occurrence of shock which might otherwise be caused by an abrupt rise in the electric current instruction value $P_M$.

As described above, because the zero point value S0 is maintained at a value obtained at the time when the operation mode has been changed from the non-travel mode to the travel mode, the accelerator instruction value So and the electric current instruction value $P_M$ can be increased correspondingly by increasing the accelerator operating amount Sa. Therefore, it is possible to drive the vehicle at a speed expected by the driver.

Then, when the accelerator operating amount Sa becomes constant at time t10, the accelerator instruction value So and the electric current instruction value $P_M$ also become constant. Furthermore, the electric current instruction value $P_M$ is determined by the accelerator instruction value So and the predetermined equation or the map. In this case also, the gradient of the electric current instruction value $P_M$ is set to a small value in order to avoid the occurrence of shock which might otherwise be caused if the electric current instruction value $P_M$ became abruptly constant.

Subsequently, when the driver starts releasing the accelerator pedal 14 at time t11, the accelerator operating amount Sa decreases in proportion to the decrease in the accelerator pedal depressing amount. At this time, the accelerator instruction value So decreases correspondingly, and the electric current instruction value $P_M$ also decreases. The electric current instruction value $P_M$ is determined by applying the accelerator instruction value So to the predetermined equation or to the map. Again, the gradient of the electric current instruction value $P_M$ is set to a small value in order to avoid the occurrence of shock which might be caused by an abrupt decrease in the electric current instruction value $P_M$.

When the accelerator operating amount Sa becomes smaller than the zero point value S0 at time t12, the accelerator instruction value So and the electric current instruction value $P_M$ also become 0. Here too, the electric current instruction value $P_M$ is determined by applying the accelerator instruction value So to the predetermined equation or to the map. In this case, again, the gradient of the electric current instruction value $P_M$ is set to a small value in order to avoid the occurrence of shock which might otherwise be caused if the electric current instruction value $P_M$ became 0 abruptly.

Furthermore, when the sum of the accelerator operating amount Sa and the play Sc becomes smaller than the sum of the zero point value S0 and the play Sc at time t13, the sum of the accelerator operating amount Sa and the play Sc is defined as the zero point value S0. In this case, if the accelerator operating amount Sa is changed, the zero point value S0 is changed correspondingly. In the meantime, the accelerator instruction value So and the electric current instruction value $P_M$ become 0.

As described above, when the sum of the accelerator operating amount Sa and the play Sc becomes smaller than the sum of the zero point value S0 and the play Sc, the aforementioned zero point value S0 can be decreased corresponding to the accelerator operating amount Sa.

Thus, when the driver increases the accelerator pedal pressure while the operation mode is a travel mode, it is possible to increase the accelerator instruction value So and the electric current instruction value $P_M$ correspondingly by increasing the accelerator operating amount Sa.

When the accelerator operating amount Sa becomes constant at time t14, the zero point value S0 also becomes constant.

Then, if the sum of the accelerator operating amount Sa and the play Sc becomes larger than the sum of the zero point value S0 and the play Sc at time t15, the accelerator instruction value So increases in proportion to the increase in the accelerator operating amount Sa.

The electric current instruction value $P_M$ also increases correspondingly. The electric current instruction value $P_M$ is determined by applying the accelerator instruction value So to the 20 predetermined equation or to the map. In this case also, the gradient of the electric current instruction value $P_M$ is set to a small value in order to avoid the occurrence of shock which would be caused by an abrupt rise in the electric current instruction value $P_M$. Then, because the sum of the accelerator operating amount Sa and the play Sc becomes larger than the sum of the zero point value S0 and the play Sc, the zero point value S0 is not changed even if the accelerator operating amount Sa is changed.

As described above, while the selected operation mode is a non-travel mode, even if the accelerator pedal 14 is depressed, the accelerator instruction value So and the electric current instruction value $P_M$ are unconditionally set to 0. After that, even if the accelerator pedal 14 is depressed at the time when the travel mode has been selected, the accelerator instruction value So and the electric current instruction value $P_M$ are maintained at 0. If the driver further depresses the accelerator pedal 14, the accelerator instruction value So and the electric current instruction value $P_M$ take values other than 0.

Furthermore, at this time, the accelerator instruction value So and the electric current instruction value $P_M$ do not correspond to the accelerator operating amount Sa, but are determined based on a difference between the accelerator operating amount Sa and the zero point value S0 which increases in proportion to the accelerator operating amount Sa.

Thus, it is possible to drive the vehicle at a speed as expected by the driver.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A control system for controlling a vehicle prime mover responsive to operation of an accelerator, comprising:

an operation mode selecting means for selecting a travel mode or a non-travel mode as an operation mode;

an accelerator operator;

operation mode detecting means for detecting the operation mode selected by said operation mode selecting means;

accelerator operating amount detecting means for detecting extent of accelerator operation by said accelerator operator as an accelerator operating amount;

accelerator instruction value determining means for unconditionally setting an accelerator instruction value at 0 responsive to selection of a non-travel mode and for determining the accelerator instruction value based on a difference between the detected accelerator operating amount and a zero point value responsive to selection of a travel mode;

output instruction value determining means for determining an output instruction value for output to a prime mover based on the operation mode selected by said operation mode selecting means and the accelerator instruction value determined by said accelerator instruction value determining means; and zero point value setting means, included within said accelerator instruction value determining means, for setting said zero point value in accordance with the detected accelerator operating amount responsive to a change of the operation mode from a non-travel mode to a travel mode.

2. A control system according to claim 1, wherein said zero point value setting means sets the sum of the accelerator operating amount and a value for accelerator play as the zero point value when the selected operation mode is a non-travel mode, and when the operation mode is changed from the non-travel mode to the travel mode, maintains the zero point value at said set value.

3. A control apparatus for a vehicle according to claim 1, wherein said zero point value setting means sets the zero point value in accordance with said accelerator operating amount when the selected operation mode is a travel mode and the sum of the accelerator operating amount and a value for accelerator play becomes smaller than the zero point value.

4. A control apparatus for a vehicle according to claim 1, wherein said prime mover is an electric motor and said output instruction value determining means determines an electric current instruction value for said motor based on the selected operation mode and the accelerator instruction value.

* * * * *

UNITED STATES PATENT AND TRADEMARK OFFICE
CERTIFICATE OF CORRECTION

PATENT NO. : 5,775,294
DATED : July 7, 1998
INVENTOR(S) : KOJIMA et al

It is certified that error appears in the above-indentified patent and that said Letters Patent is hereby corrected as shown below:

Title page, item "[22] Filed: Dec. 29, 1996" should read --[22] Filed: Dec. 27, 1996--.

Col. 1, line 64, "P0is" should read --$P_o$ is--.

Col. 5, line 31, "PM" should read --$P_M$--.

Col. 10, line 54, delete "20".

Signed and Sealed this

Thirtieth Day of May, 2000

Q. TODD DICKINSON

*Attest:*

*Attesting Officer*  *Director of Patents and Trademarks*